United States Patent [19]

Tolino et al.

[11] Patent Number: 4,591,068
[45] Date of Patent: May 27, 1986

[54] CORE BARREL PLUG

[75] Inventors: Ralph W. Tolino, Pittsburgh, Pa.;
Ronald J. Hopkins, Pensacola, Fla.;
Ray L. Congleton, Gonzalez, Fla.;
Craig H. Popalis, Pensacola, Fla.

[73] Assignee: Westinghouse Electric Corp., Pittsburgh, Pa.

[21] Appl. No.: 466,464

[22] Filed: Feb. 15, 1983

[51] Int. Cl.⁴ .................. F16L 55/10; G21C 13/00
[52] U.S. Cl. .................. 220/240; 220/326;
138/89; 376/203; 376/204; 376/285; 376/463
[58] Field of Search ............ 376/204, 203, 352, 463,
376/285; 220/240, 326, 316, 315; 277/111, 113,
142; 138/89, 90, 93

[56] References Cited

U.S. PATENT DOCUMENTS

| | | | |
|---|---|---|---|
| 1,178,145 | 4/1916 | Florence et al. | 138/89 X |
| 1,470,767 | 10/1923 | Schaper | 220/24.5 X |
| 2,656,200 | 10/1953 | Galliers | 277/111 |
| 2,810,494 | 10/1957 | Smith | 220/240 |
| 3,062,240 | 11/1962 | Franck | 138/89 |
| 3,124,158 | 3/1964 | Pentold | 220/316 X |
| 3,125,123 | 3/1964 | Roche et al. | 138/89 |
| 3,156,373 | 11/1964 | Willis | 138/89 X |
| 3,653,410 | 4/1972 | West | 138/89 |
| 3,691,609 | 9/1972 | Ice, Jr. et al. | 29/252 |
| 3,825,146 | 7/1974 | Hirmann | 220/24.5 |
| 4,135,973 | 1/1979 | Golden | 220/232 X |
| 4,152,392 | 5/1979 | Crist | 220/326 X |
| 4,158,370 | 6/1979 | Larson | 138/89 |
| 4,335,757 | 6/1982 | Lankston | 138/89 X |
| 4,369,662 | 1/1983 | Rieben | 73/862.01 |
| 4,390,042 | 6/1983 | Kucherer et al. | 138/89 |
| 4,417,598 | 11/1983 | DePirro | 138/93 X |
| 4,425,298 | 1/1984 | Shields | 376/249 |
| 4,436,117 | 3/1984 | Martin | 138/89 |

Primary Examiner—Deborah L. Kyle
Assistant Examiner—Dan Wasil
Attorney, Agent, or Firm—L. A. DePaul

[57] ABSTRACT

The invention comprises a core barrel plug capable of being remotely installed in a port of a core barrel of a pressurized water nuclear reactor for converting the reactor from a by-pass downflow configuration to a by-pass upflow configuration. The plug comprises a body having an expandable cylindrical portion with a movable mandrel disposed in the body. Remote fluid pressurization causes the mandrel to be advanced thus expanding the body into contact with the port. The plug also comprises a locking mechanism to prevent inadvertent release of the plug.

5 Claims, 7 Drawing Figures 4,591,068

CORE BARREL PLUG

BACKGROUND OF THE INVENTION

This invention relates to plugging devices and more particularly to plugs for altering the flow of coolant in a nuclear reactor.

Conventional pressurized water reactors comprise a reactor vessel with a reactive core disposed therein which produces heat in a manner well understood in the art. A water coolant is circulated through the reactor vessel and in heat transfer relationship with the core so that heat is transferred from the core to the water coolant. The reactive core generally comprises a plurality of fuel assemblies comprising nuclear fuel. The fuel assemblies are surrounded by a plurality of vertical metal baffle plates that define the outer limits of the core. Although the baffle plates are joined together to form an outer perimeter for the core, the individual baffle plates are not welded together. Since the baffle plates are not welded together, small gaps may exist between two adjacent baffle plates. Because the baffle plates serve to direct the flow of reactor coolant water through the reactor core, the small gaps between the baffle plates do not detract from the performance of this function. However, since a substantial pressure differential may exist across the baffle plates, it is possible for small streams of high velocity reactor coolant to be established through the gaps between these baffle plates. These streams of reactor coolant can cause vibrations in the fuel assemblies or otherwise damage the fuel assemblies.

One solution to this baffle jetting of coolant is disclosed in copending application Ser. No. 252,116, filed Apr. 8, 1981 in the name of E. P. Shields entitled "Baffle Maintenance Apparatus" and assigned to the Westinghouse Electric Corporation now U.S. Pat. No.4,425,298. In the copending application there is described apparatus for reducing the size of the gaps between the baffle plates to thereby reduce the jetting of coolant therethrough.

While there exists in the art methods and apparatus for reducing or eliminating the jetting of coolant through the gaps between baffle plates, what is needed is a device to alter the pressure differential across the baffle plates to eliminate or reduce the cause of the problem.

SUMMARY OF THE INVENTION

The invention comprises a core barrel plug capable of being remotely installed in a port of a core barrel of a pressurized water nuclear reactor for converting the reactor from a by-pass downflow configuration to a by-pass upflow configuration. The plug comprises a body having an expandable cylindrical portion with a movable mandrel disposed in the body. Remote fluid pressurization causes the mandrel to be advanced thus expanding the body into contact with the port. The plug also comprises a locking mechanism to prevent inadvertent release of the plug.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

DESCRIPTION OF THE PREFERRED EMBODIMENT

A substantial pressure differential may exist across the baffle plates in a nuclear reactor core which may result in small streams of high velocity reactor coolant being established through the gaps between the baffle plates which may result in damage to the reactor fuel in the core. The invention described herein provides a device for altering the direction of the flow of reactor coolant in a manner to reduce the pressure differential across the baffle plates thus minimizing or eliminating flow of high velocity reactor coolant through the gaps between the baffle plates.

Figure 1:
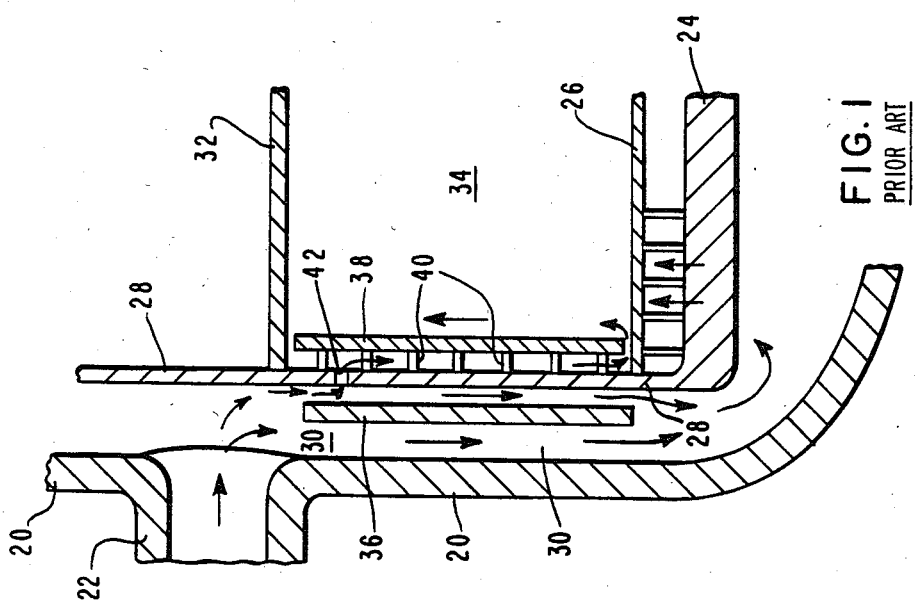
FIG. 1 is a cross-sectional view in elevation of a pressurized water nuclear reactor illustrating a downflow configuration.
Figure 3:
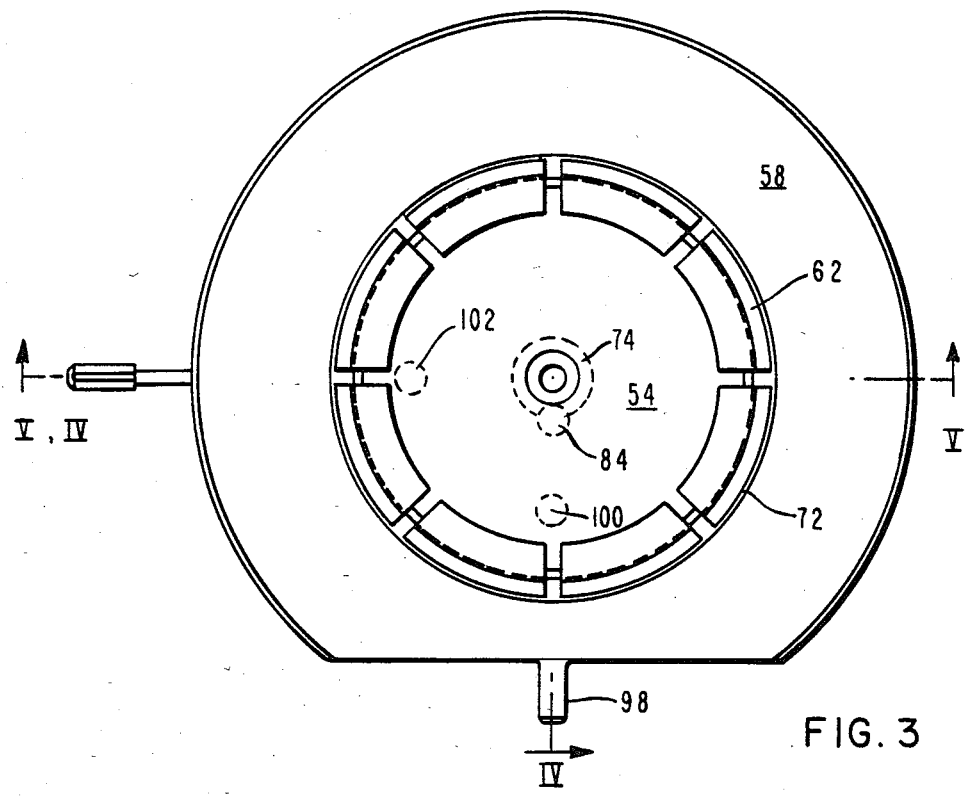
FIG. 3 is a side view of the plug.

Referring to FIG. 1, a typical pressurized water nuclear reactor comprises a reactor vessel 20 having an inlet 22 through which the reactor coolant, which may be water pressurized to about 2250 psi, enters reactor vessel 20. Reactor vessel 20 has a core support plate 24 disposed therein with a lower core plate 26 disposed above it. A substantially cylindral core barrel 28 is disposed in reactor vessel 20 and is attached to core support plate 24 and lower core plate 26 while defining an annulus between core barrel 28 and reactor vessel 20 which is generally referred to as downcomer 30. An upper core plate 32 is attached to core barrel 28 above lower core plate 26 with the region between lower core plate 26 and upper core plate 32 defining the reactor core 34. Reactor core 34 may comprise nuclear fuel assemblies (not shown) chosen from those well known in the art.

A thermal shield 36 may be disposed between reactor vessel 20 and core barrel 28 and in downcomer 30 for thermally shielding reactor vessel 20 from the heat produced by core 34.

Still referring to FIG. 1, a series of substantially vertically arranged metal baffle plates 38 are disposed between core 34 and core barrel 28 for defining the outer edge of core 34. A series of formers 40 are horizontally attached to core barrel 28 and to baffle plates 38 for supporting baffle plates 38. Baffle plates 38 may generally be bolted together along their vertical edges but are not normally welded or otherwise sealed together. Core barrel 28 may also have several horizontal flow ports 42 which may number approximately 16 and may be spaced at approximately equal distances around the circumference of core barrel 28. Ports 42 extend through core barrel 28 and are located below upper core plate 32 for allowing the reactor coolant to flow from downcomer 30 through ports 42 and between core barrel 28 and baffle plates 38 for cooling core barrel 28 and baffle plates 38.

In a typical pressurized water nuclear reactor, the reactor coolant enters reactor vessel 20 through inlet 22 and flows downwardly through downcover 30 and up through holes (not shown) in core support plate 24 and lower core plate 26. The reactor coolant proceeds upwardly through core 34 where heat is transferred from core 34 to the reactor coolant. The reactor coolant is then conducted out of reactor vessel 20 to the remainder of the steam supply system.

As can be seen from FIG. 1, a small amount of reactor coolant in downcomer 30 flows through ports 42 and into the space between core barrel 28 and baffle plates 38. This by-pass flow then flows downwardly through holes (not shown) in formers 40 and around the bottom of baffle plates 38 near lower core plate 26 were the by-pass flow returns to the main coolant flow path. The purpose of the by-pass flow is to cool core barrel 28 and baffle plates 38. However, since the pressure of the by-pass flow is substantially higher than that of the coolant in the core region and since baffle plates 38 have small openings between them, small high velocity jets of coolant may be established that flow between baffle plates 38 and in the direction of core 34. These high velocity jets of coolant may cause damage to the nuclear fuel assemblies located near baffle plates 38 which may require that these jets of coolant be eliminated.

Figure 2:
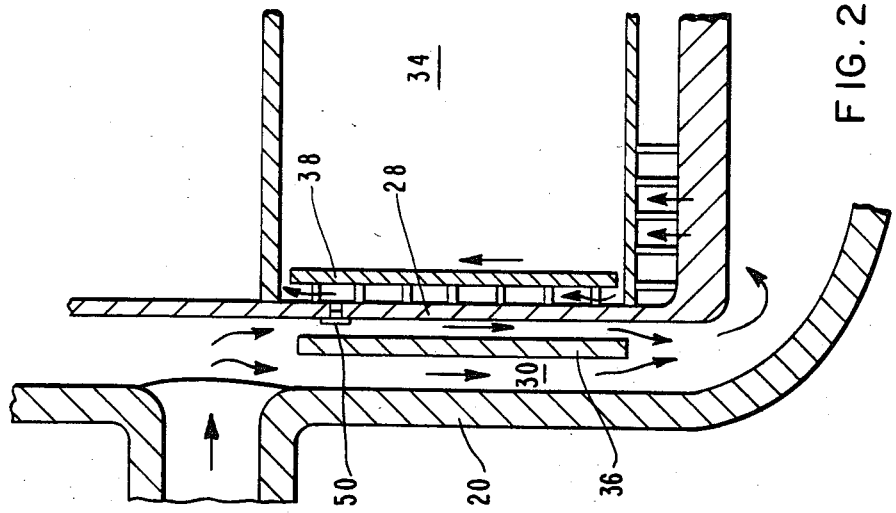
FIG. 2 is a cross-sectional view in elevation of a pressurized water nuclear reactor illustrating an upflow configuration.

Referring to FIG. 2, one method of eliminating these high velocity jets of coolant is to fill ports 42 with a plug 50, and to machine a hole in the uppermost former 40. With ports 42 filled by plugs 50, no coolant is allowed to flow through ports 42 which causes all of the in-coming coolant to flow downwardly through downcomer 30 and up through core support plate 24 and lower core plate 26. However, because ports 42 have been plugged, a small amount of by-pass flow will be established upwardly between core barrel 28 and baffle plates 38 for cooling core barrel 28 and baffle plates 38 as shown in FIG. 2. In this flow configuration, the pressure of the upward by-pass flow is substantially equal to the pressure of the coolant in core 34 so that no high velocity jets are established. Thus, by plugging ports 42 and machining holes in top former 40, the by-pass flow can be reversed from a downwardly flow to an upward flow thereby eliminating the jetting problem while providing the required cooling for core barrel 28 and baffle plates 28.

In order to acomplish this by-pass flow reversal, plug 50 must be manufactured to be compatible with the reactor internals and be capable of withstanding a steady state pressure differential of 70 psi and a transient pressure differential of approximately 900 psi. In addition, plug 50 must be capable of being remotely installed between thermal shield 36 and core barrel 28 where the distance therebetween is less than 2 inches and where the installation must take place under approximately 20 feet of water in a highly radioactive environment.

Figure 4:
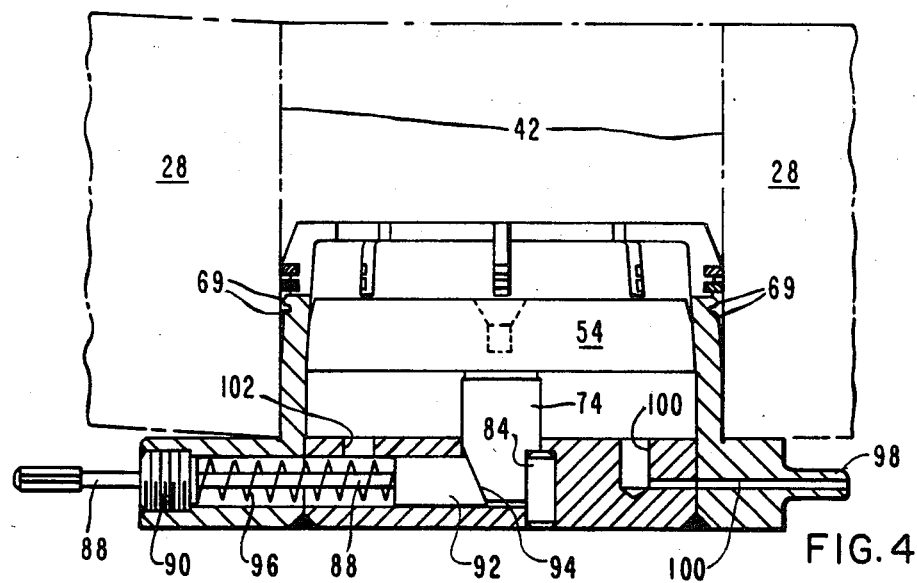
FIG. 4 is a view along line IV—IV of FIG. 3.

Referring now to FIGS. 3-6, plug 50 comprises a body 52 with a mandrel 54 slidably disposed in bore 56 of body 52. Body 52 which may be manufactured from type 304 stainless steel may be approximately 4 inches in diameter and approximately 1.5 inches long. Body 52 may comprise a flange 58 and a substantially cylindrical portion 60. Flange 58 may be formed to have an outside diameter larger than the diameter of port 42 so that flange 58 may seat on the outside of port 42 as shown in FIG. 4. Flange 58 also has an inside diameter that defines bore 56. Cylindrical portion 60 may be formed to have a leading tapered edge 62 for aiding the insertion of cylindrical portion 60 into port 42. The portion of bore 56 defined by the inside diameter of cylindrical portion 60 is tapered so as to have a slightly smaller inside diameter near the leading edge of cylindrical portion 60. Cylindrical portion 60 also has a plurality of slots 64 therein which extend from the leading edge of cylindrical portion 60 and extend from the outside diameter to the inside diameter thereof. Slots 64 provide cylindrical portion 60 with sufficient flexibility and resiliency to enable expansion of cylindrical portion 60 under the action of mandrel 54. Cylindrical portion 60 is also formed with a lip 66 near its leading edge to hold mandrel 54 in body 52 and prevent overexpansion of cylindrical portion 60. In addition, cylindrical portion 60 has a first groove 68 therein that extends around the entire circumference thereof and located near the forwardmost section of cylindrical portion 60 but not in the section of cylindrical portion 60 that has slots 64 therein. First groove 68 provides further flexibility for cylindrical portion 60 and enhances the seal between cylindrical portion 60 and the inside surface of port 42 when cylindrical portion 60 is expanded. Raised ribs 69, on either side of first groove 68, are provided for being pressed against the inside surface of port 42 for enhancing sealing therebetween. Cylindrical portion 60 also has a set of second grooves 70 therein that extend around the entire circumference thereof which are located in the portion of cylindrical portion 60 that has slots 64. Each second groove 70 has a metal ring 72 disposed therein which may be made of age-hardened stainless steel and are arranged to contact the inside surface of port 42 when cylindrical portion 60 is expanded thereby indenting into the inside surface of port 42 for holding plug 50 in place.

Still referring to FIGS. 3-6, mandrel 54 may be a substantially cylindrical member made of stainless steel and slidably disposed in cylindrical portion 60 of body 52. Mandrel 54 serves to expand cylindrical portion 60 into contact with the inside surface of port 42 when mandrel 54 is moved toward the leading edge of cylindrical portion 60. Mandrel 54 has a first pin 74 disposed in approximately the center thereof and extending from the back surface thereof. First pin 74 may have an inclined surface 76 and a notch 78 or as an alternative, surface 76 may be a flat surface.

Plug 50 also comprises an end plug 80 disposed in the portion of bore 56 defined by the inside diameter of flange 58. End plug 80 may be welded to flange 58 so that mandrel 54 may first be inserted into body 52 and then a leak-tight seal be formed between end plug 80 and flange 58. End plug 80 may have an L-shaped channel 82 therein into which first pin 74 of mandrel 54 is slidably disposed. A second pin 84 may be disposed in and slightly off center of end plug 80 and extends through a portion of channel 82 and into notch 78 of first pin 74 and serves to prevent first pin 74 and mandrel 54 from rotating in body 52.

Figure 5:
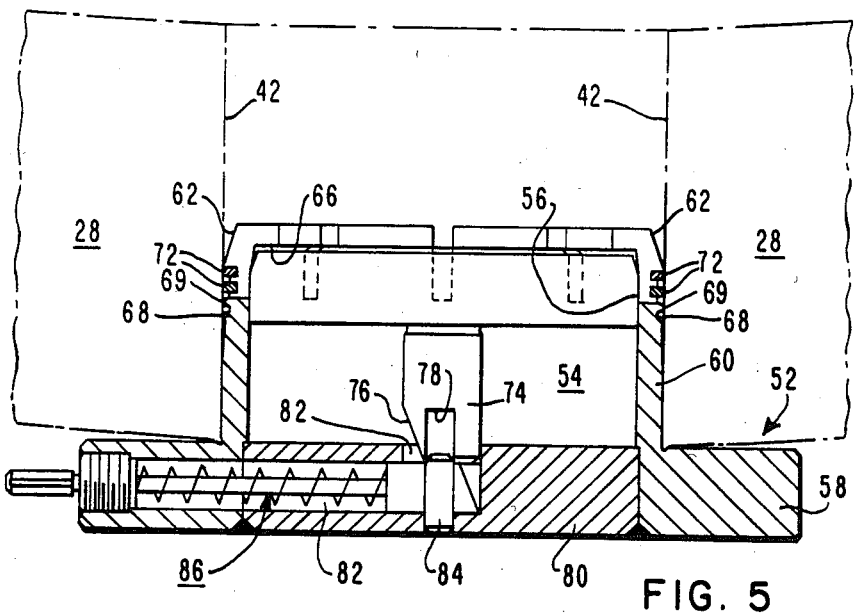
FIG. 5 is a view along line V—V of FIG. 3.
Figure 6:
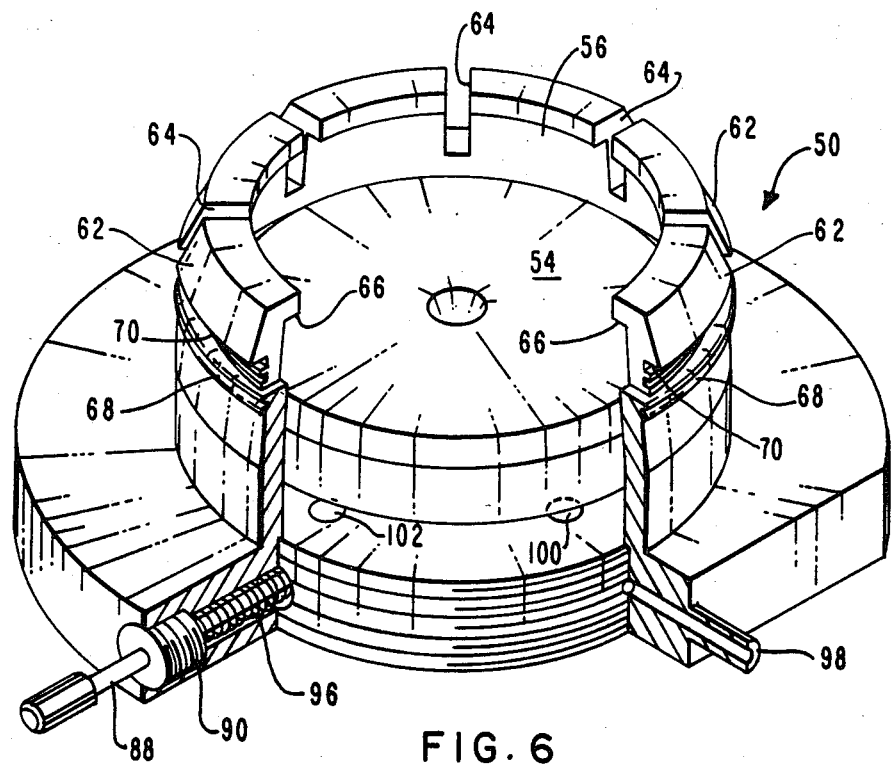
FIG. 6 is an isometric view of the plug.

Plug 50 also comprises a locking mechanism 86 which may be disposed in channel 82 and extends to an outer surface of flange 58. Locking mechanism 86 comprises a rod 88 slidably mounted and sealed in a threaded bushing 90 with bushing 90 mounted in flange 58. Rod 88 has a contact member 92 attached to the end of rod 88 that is disposed in channel 82. Contact member 92 has a leading edge 94 that may be tapered or flat to match surface 76. A biasing means 96 which may be a coil spring is disposed around rod 88 and between contact member 92 and bushing 90 for urging rod 88 and contact member 92 toward first pin 74. Rod 88 may be mounted in bushing 90 and contact member 92 such that rotation of the end of rod 88 extending from flange 58 can cause biasing means 96 to become more or less compressed thus adjusting the compression of biasing means 96. When mandrel 54 is moved toward the leading edge of plug 50, first pin 74 is moved partially out of channel 82. As first pin 74 is moved out of channel 82, biasing means 96 causes rod 88 and contact member 92 to be moved into a position as shown in FIG. 5. When in this position, contact member 92 prevents first pin 74 and mandrel 54 from moving back to the position of FIG. 4. Thus, locking mechanism 86 provides a means to prevent inadvertent movement of mandrel 54 after mandrel 54 has been moved toward the leading edge of plug 50.

Flange 58 also has a stem 98 through which a passageway 100 is defined for introducing a fluid, which may be water, into plug 50. The fluid may be used to activate plug 50 by pressurizing the area between end plug 80 and mandrel 54. The fluid pressure causes mandrel 54 to be moved toward the leading edge of plug 50 thereby expanding cylindrical portion 60 into contact with the inside surface of port 42. To aid in the movement of locking mechanism 86, a hole 102 may be provided in end plug 80 that extends from channel 82 to the side of end plug 80 that faces mandrel 54. Hole 102 provides a means to allow the fluid to enter channel 82 behind contact member 92 to thus equalize the fluid pressure on both sides of contact member 92 which aids in the movement of rod 88.

Figure 7:
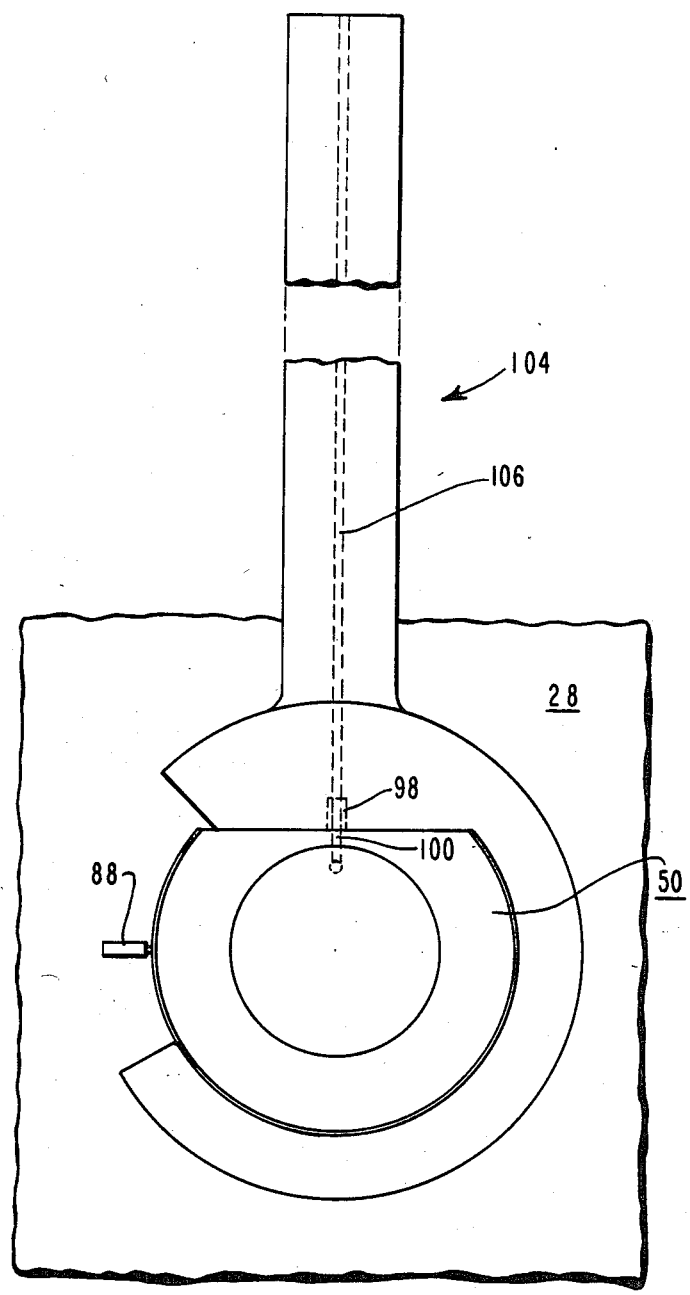
FIG. 7 is a view in elevation of the plug and the installation tool.

Referring now to FIG. 7, an installation tool 104 having a fluid conduit 106 therein may be used to install plug 50 in plug 42. Installation tool 104 may have a crescent type configuration and be capable of holding plug 50. With plug 50 held by installation tool 104, stem 98 is connected to fluid conduit 106 so that the fluid may be introduced from outside reactor vessel 20 to plug 50 for activating plug 50.

OPERATION

When it is desired to convert a pressurized water nuclear reactor from a downflow configuration as shown in FIG. 1 to an upflow configuration as shown in FIG. 2, the reactor is shut down and the reactor vessel head is removed to provide access to core barrel 28. Installation tool 104 with plug 50 mounted therein is then positioned between core barrel 28 and thermal shield 36 so that cylindrical portion 60 of plug 50 is arranged to be inserted in port 42. In this position, installation tool 104 may have to be extended more than 20 feet under water in a highly radioactive environment in order to properly position plug 50.

Once plug 50 has been positioned near port 42, installation tool 104 may be used to insert cylindrical portion 60 into port 42. With cylindrical portion 60 inserted in port 42, fluid may be introduced through fluid conduit 106 and through passageway 100 at a pressure of between approximately 3,000–6,000 psi. The fluid causes mandrel 54 to move from a position as shown in FIG. 4 to a position as shown in FIG. 5 by moving mandrel 54 toward the leading edge of plug 50. As mandrel 54 is moved, it causes cylindrical portion 60 to expand into contact with the inside surface of port 42. At the same time, rings 72 and ribs 69 firmly contact the inside surface of port 42 thereby preventing flow of reactor coolant through port 42. As mandrel 54 is advanced, locking mechanism 86 is activated by biasing means 96 which locks mandrel 54 in the expanded position.

Therefore, the invention provides a core barrel plug for plugging holes in the core barrel and preventing flow of reactor coolant therethrough.

We claim:

1. A plug for preventing flow through a port in a core barrel of a pressurized water nuclear reactor comprising:

a substantially cylindrical body formed with a cylindrical portion and a flange and defining a tapered leading open end with the other end being closed by an end plug attached to said flange, said body defining a bore therein extending from said open end to said end plug with said bore having a smaller diameter near said open end than near said end plug, said cylindrical portion having a lip near said open end and being formed with a plurality of longitudinal slots extending from said open end toward said flange and extending entirely through the thickness of said cylindrical portion, said cylindrical portion having a circumferential first groove on the outer surface thereof located near the forwardmost portion of said cylindrical portion but not in the section of said cylindrical portion that has said slots therein, and a plurality of circumferential second grooves on the outer surface thereof located in the section of said cylindrical portion that has said slots therein, said first and second grooves establishing a seal between said cylindrical portion and the inside surface of said port when said cylindrical portion is expanded, and said flange and said end plug having a passageway defined therein for introducing a fluid into said body;

a metal ring disposed in each of said second grooves;

a mandrel slidably disposed and captured in said body and capable of being moved toward said open end of said body when said fluid is introduced through said passageway, thereby causing said cylindrical portion to be expanded into contact with the inside surface of said port; and a locking mechanism disposed in said end plug for preventing inadvertent movement of said mandrel.

2. The plug according to claim 1 wherein said mandrel comprises a first pin disposed in approximately the center thereof and extending from one surface toward said end plug.

3. The plug according to claim 2 wherein said end plug has a channel therein into which said first pin is disposed for maintaining alignment of said mandrel.

4. The plug according to claim 3 wherein said locking mechanism comprises a bushing disposed in said end plug;

a rod slidably disposed in said bushing;

a contact member attached to an end of said rod for contacting said first pin; and biasing means disposed between said contact member and said bushing for urging said contact member toward said first pin.

5. The plug according to claim 4 wherein said end plug further comprises a second pin disposed therein and partially disposed in a notch in said first pin for preventing rotation of said mandrel.

* * * * *